(12) United States Patent
Miyake et al.

(10) Patent No.: US 7,037,949 B2
(45) Date of Patent: May 2, 2006

(54) ION-EXCHANGE RESIN MEMBRANE AND METHOD FOR PRODUCING THE SAME

(75) Inventors: Naoto Miyake, Kamakura (JP); Takuya Hasegawa, Yokohama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 10/467,449

(22) PCT Filed: Feb. 7, 2002

(86) PCT No.: PCT/JP02/01027

§ 371 (c)(1),
(2), (4) Date: Aug. 7, 2003

(87) PCT Pub. No.: WO02/062878

PCT Pub. Date: Aug. 15, 2002

(65) Prior Publication Data

US 2005/0075406 A1    Apr. 7, 2005

(30) Foreign Application Priority Data

Feb. 7, 2001   (JP) .............................. 2001-030428
May 31, 2001   (JP) .............................. 2001-164311

(51) Int. Cl.
*C08F 8/22*   (2006.01)

(52) U.S. Cl. ............................ 521/27; 521/30; 521/31; 204/252; 525/353; 525/368; 525/369

(58) Field of Classification Search ................. 521/27, 521/30, 31; 525/353, 368, 369; 204/252
See application file for complete search history.

(56) References Cited

U.S. PATENT DOCUMENTS

| | | | | |
|---|---|---|---|---|
| 3,069,728 A | * | 12/1962 | Mindick et al. | ............ 264/316 |
| 4,189,540 A | * | 2/1980 | Seita et al. | .................. 521/27 |
| 5,066,682 A | | 11/1991 | Miyazaki et al. | |
| 5,132,285 A | * | 7/1992 | Tsai | .......................... 507/121 |

FOREIGN PATENT DOCUMENTS

| | | |
|---|---|---|
| JP | 54-106088 A | 8/1979 |
| JP | 54-158378 A | 12/1979 |
| JP | 57-139127 A | 8/1982 |
| JP | 59-84925 A | 5/1984 |
| JP | 61-19638 A | 1/1986 |
| JP | 62-235492 A | 10/1987 |
| JP | 3-6240 A | 1/1991 |
| JP | 2000-149965 A | 5/2000 |
| JP | 2000-336187 A | 12/2000 |

* cited by examiner

*Primary Examiner*—Bernard Lipman
(74) *Attorney, Agent, or Firm*—Birch, Stewart, Kolasch & Birch, LLP (57) ABSTRACT

A reactive liquid is coated on an ion exchange resin precursor membrane for the hydrolysis treatment. Preferably, a reactive liquid having a viscosity of not lower than 50 mPa·s or a small surface tension is used. Said precursor membrane is also subjected to the hydrolysis treatment under constraint, while the precursor membrane is maintained in a widened or a stretched state.

14 Claims, 3 Drawing Sheets

ION-EXCHANGE RESIN MEMBRANE AND METHOD FOR PRODUCING THE SAME

This application is the national phase under 35 U.S.C. § 371 of PCT International Application No. PCT/JP02/01027 which has an International filing date of Feb. 7, 2002, which designated the United States of America.

TECHNICAL FIELD

The present invention relates to a method for manufacturing an ion exchange resin membrane used for fuel cells and an ion exchange resin membrane prepared according to the manufacturing method.

PRIOR ART

Furthermore, an aqueous alkaline solution was used as a reactive liquid in the inventions disclosed in JP-A-61-19638, JP-A-57-139127 and JP-A-3-6240, but the uniform coating of the solution on an ion exchange resin precursor membrane was difficult (see FIG. 3). The present inventors extensively studied and found that an increase in viscosity of the reactive liquid enabled a uniform coating of the solution on an ion exchange resin precursor membrane, resulting in a uniform hydrolysis treatment (see FIG. 1). Further, the present inventors also found that a decrease in surface tension of the reactive liquid by, for example, using a non-aqueous type of liquid dramatically improves wettability, resulting in a uniform coating on the above-described precursor membrane. Further, the present inventors also found that the hydrolysis treatment could be performed even by using a non-aqueous type of reactive liquid. Still further, the present inventors found that, in this procedure, defects such as wrinkle or sag were remarkably improved by performing the hydrolysis treatment of an ion exchange resin precursor membrane under constrained conditions while the membrane was maintained in a widened or stretched state by using a tenter and the like.

As an example of an ion exchange resin, a perfluoro type of solid polyelectrolyte is known, typically represented by, for example, Nafion (registered trademark of a commercial product from DuPont Co.). The perfluoro type of solid poly electrolyte has as one feature, very high chemical stability.

An ion exchange resin membrane having a carboxylic acid group and/or a sulfonic acid group, suitable for the above applications can be manufactured by, for example, preparing a membrane as an ion exchange resin precursor having plasticity, followed by forming an ion exchange group by hydrolyzing the ion exchange precursor. In this case, hydrolysis treatment of the ion exchange precursor is executed by immersing the ion exchange resin precursor membrane in a reactive liquid such as an alkaline bath. More specifically, the treatment includes, for example, a hydrolysis treatment using an aqueous solution containing 20 to 25% of sodium hydroxide at 70 to 90° C. for 16 hours as disclosed in JP-A-61-19638, a hydrolysis treatment using an aqueous solution containing 11 to 13% of potassium hydroxide and 30% of dimethylsulfoxide at 90° C. for 1 hour as disclosed in JP-A-57-139127, and a hydrolysis treatment using an aqueous solution containing 15 to 50% by weight of alkaline-hydroxide and 0.1 to 30% by weight of a water-soluble organic compound at 60 to 130° C. for 20 minutes to 24 hours as disclosed in JP-A-3-6240.

However, in these methods of continuous hydrolysis treatment wherein a film of an ion exchange resin precursor membrane is immersed in an alkaline bath (hereinafter, referred to as immersion method), the composition must be controlled in the alkaline bath so as to avoid the effect of changing the quality of the composition with a passage of time. In particular, fluorinated substances generated by the hydrolysis treatment and accumulated in the alkaline bath during the treatment period had to be removed. Thus, these methods required periodical exchange of the alkaline bath, thereby causing problems of not only making the process complicated but also discharging large quantities of industrial waste.

Another problem is that ion exchange resin precursor membranes are hydrophobic whereas hydrolyzed ion exchange resin membranes become hydrophilic. This results in significant swelling by water absorption, in particular, in a horizontal direction (perpendicular to a thickness direction of the membrane). Such swelling in a horizontal direction causes wrinkle or sag problems unless sequential widening is performed. Therefore, in the usual immersion methods, a measure is employed so that treatment is performed under the conditions of a slow hydrolysis rate while the swelling of the membrane is suppressed, in order to prevent an abrupt generation of membrane swelling. This method, however, still causes quality problems such as wrinkle and sag.

Another way to solve this problem is by a method of widening or stretching the ion exchange resin precursor membrane and performing the hydrolysis treatment of the membrane under constrained conditions, under which the widened or stretched state is maintained by using a tenter or the like. This method, however, has the problems of durability of materials for bearing and the like, because the tenter has to be continuously used at a high temperature in an alkaline bath.

Therefore, it was necessary to solve the above problems and improve productivity.

DISCLOSURE OF THE INVENTION

An object of the present invention is to provide a method for performing a hydrolysis treatment on an ion exchange resin precursor membrane without immersing the membrane in an alkaline bath, which causes problems such as complicated management and control and discharge of a large quantity of industrial waste, and manufacturing an ion exchange resin membrane with high quality.

To solve the above-described problems, the present inventors developed a method for hydrolysis treatment by coating a reactive liquid on an ion exchange resin precursor membrane. Use of this method eliminates the alkaline bath and enables the hydrolysis treatment without exposing a stretching machine or a widening machine such as a tenter to the alkaline bath.

Figure 3:
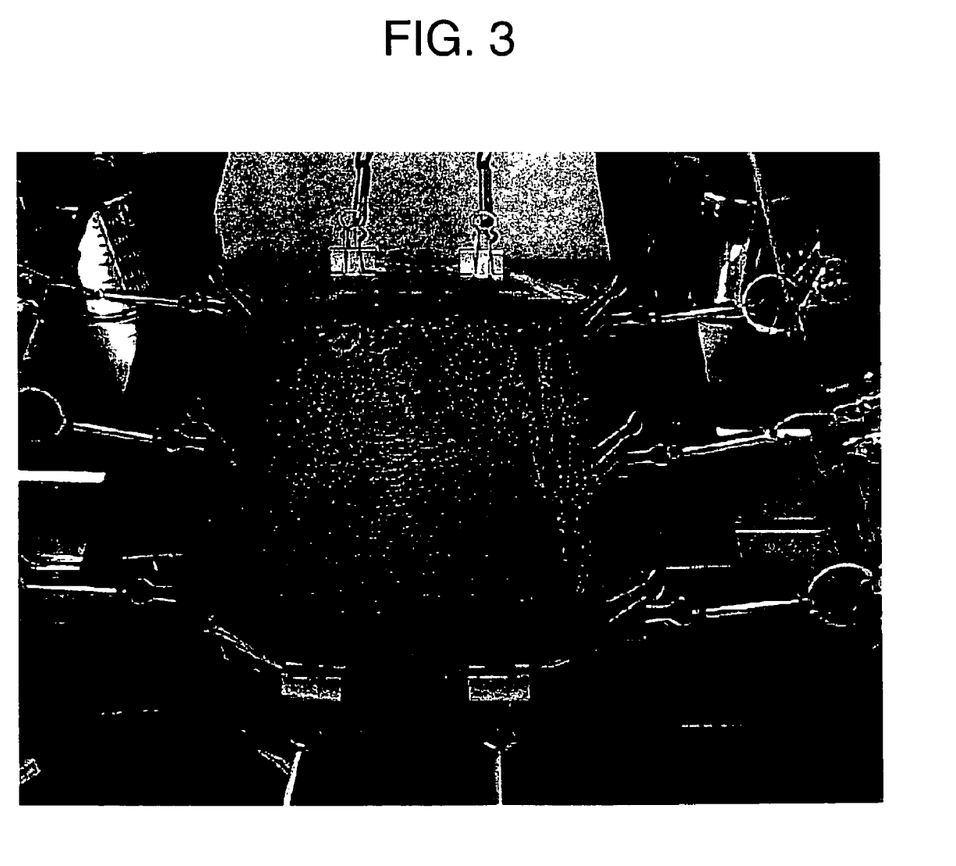
FIG. 3 is a photograph showing the hydrolysis treatment for an ion exchange resin precursor membrane in Comparative Example 2.

Furthermore, an aqueous alkaline solution was used as a reactive liquid in the inventions disclosed in JP-A-61-19638, JP-A-57-139127 and JP-A-3-6240, but the uniform coating of the solution on an ion exchange resin precursor membrane was difficult (see FIG. 3). The present inventors extensively studied and found that an increase in viscosity of the reactive liquid enabled a uniform coating of the solution on an ion exchange resin precursor membrane, resulting in a uniform hydrolysis treatment (see FIG. 1). Further, the present inventors also found that a decrease in surface tension of the reactive liquid by, for example, using a non-aqueous type of liquid dramatically improves wettablity, resulting in a uniform coating on the above-described precursor membrane. Further, the present inventors also found that the hydrolysis treatment could be performed even by using a non-aqueous type of reactive liquid. Still further, the present inventors found that, in this procedure, defects such as wrinkle or sag were remarkably improved by performing the hydrolysis treatment of an ion exchange resin precursor membrane under constrained conditions while the membrane was maintained in a widened or stretched state by using a tenter and the like.

Thus, the present invention includes the following:

(1) A method for manufacturing an ion exchange resin membrane by contacting an ion exchange resin precursor membrane having an ion exchange group precursor with a reactive liquid to hydrolyze said ion exchange group precursor, comprising coating said reactive liquid on said precursor membrane.

(2) The method in accordance with the above-described (1), wherein said reactive liquid has a viscosity of at least 50 mPa·s at 20° C. under atmospheric pressure.

(3) The method in accordance with the above-described (1) or (2), wherein said reactive liquid contains polysaccharides(s) and/or a derivative(s) thereof.

(4) The method in accordance with any one of the above-described (1) to (3), wherein said reactive liquid contains a surfactant.

(5) The method in accordance with any one of the above-described (1) to (4), wherein said reactive liquid contains a non-aqueous type of reactive liquid as a main component.

(6) The method in accordance with any one of the above-described (1) to (5), wherein said reactive liquid contains a film-forming agent.

(7) The method in accordance with any one of the above-described (1) to (6), comprising widening or stretching said precursor membrane and/or said ion exchange resin membrane.

(8) The method in accordance with the above-described (7), comprising widening or stretching said precursor membrane and/or said ion exchange resin membrane, subsequently maintaining said precursor membrane and/or said ion exchange resin membrane under constrained conditions.

(9) A method for manufacturing a proton type of ion exchange resin membrane by contacting an ion exchange resin membrane with an acidic liquid, comprising subjecting said ion exchange resin precursor membrane to a hydrolysis treatment by the method in accordance with any one of the above-described (1) to (8), and subsequently coating an acidic liquid on said membrane.

(10) A method for manufacturing an ion exchange resin membrane by contacting an ion exchange resin precursor membrane having an ion exchange group precursor with a reactive liquid to hydrolyze said ion exchange group precursor, wherein said reactive liquid contains a non-aqueous type of reactive liquid as the main component.

(11) The method in accordance with the above-described (10), wherein said non-aqueous type of reactive liquid has a boiling point above 100° C.

(12) The method in accordance with any one of the above-described (10) to (11), comprising coating said reactive liquid on said precursor membrane.

(13) The method in accordance with any one of the above-described (10) to (12), wherein said reactive liquid has a viscosity of at least 50 mPa·s at 20° C. under atmospheric pressure.

(14) The method in accordance with any one of the above-described (10) to (13), wherein said reactive liquid contains a surfactant.

(15) The method in accordance with any one of the above-described (10) to (14), wherein said reactive liquid contains a film-forming agent.

(16) An ion exchange resin membrane manufactured by the method in accordance with any one of the above-described (1) to (15).

(17) A membrane/electrode assembly having the ion exchange resin membrane in accordance with the above-described (16).

(18) A solid polymer type of fuel cell having the ion exchange resin membrane in accordance with the above-described (16).

BEST MODE FOR CARRYING OUT THE INVENTION

An ion exchange resin membrane of the present invention is manufactured by contacting an ion exchange resin precursor membrane with a reactive liquid to hydrolyze an ion exchange group precursor. The ion exchange resin precursor used in the present invention is manufactured as follows.

(Manufacturing of an Ion Exchange Resin Precursor)

An ion exchange resin precursor is a fluorocarbon polymer having an ion exchange group precursor such as a sulfonic acid group and a carboxylic acid group. A preferable fluorocarbon polymer is a copolymer of fluorinated olefin represented by $CF_2=CX^1X^2$ (wherein, $X^1$ and $X^2$ are independently a halogen atom or a perfluoroalkyl group with 1 to 3 carbon atoms, respectively) and a fluorinated vinyl compound represented by:

(wherein, b is an integer of 0 to 8; c is 0 or 1; d, e and f are independently an integer of 0 to 6, respectively; and d+e+f is not equal to 0; $R^1$ and $R^2$ are independently a halogen atom or a perfluoroalkyl group or a fluorochloroalkyl group with 1 to 10 carbon atoms, respectively; $X^3$ is a halogen atom or a perfluoroalkyl group with 1 to 3 carbon atoms; $X^5$ is $CO_2R^3$, $COR^4$ or $SO_2R^3$ (wherein $R^3$ is a hydrocarbon type of alkyl group with 1 to 3 carbon atoms; $R^4$ is a halogen atom)).

A typical fluorinated olefin includes, but is not particularly limited to, $CF_2=CF_2$, $CF_2=CFCl$ and $CF_2=CCl_2$. A fluorinated vinyl compound is not particularly limited, but includes $CF_2=CFO(CF_2)_z-SO_2F$, $CF_2=CFOCF_2CF(CF_3)O(CF_2)-SO_2F$, $CF_2=CF(CF_2)_z-SO_2F$, $CF_2=CF(OCF_2CF(CF_3))_z-(CF_2)_{z-1}-SO_2F$, $CF_2=CFO(CF_2)-CO_2R$, $CF_2=CFOCF_2CF(CF_3)O(CF_2)_z-CO_2R$, $CF_2=CF(CF_2)-CO_2R$ and $CF_2=CF(OCF_2CF(CF_3))_z-(CF_2)_z-CO_2R$ (wherein, z is an integer of 1 to 8; R is a hydrocarbon type of alkyl group with 1 to 3 carbon atoms).

Further, the above-described fluorocarbon copolymer may be a copolymer containing a third component including perfluoroolefins such as hexafluoropropylene and chlorofluoroethylene; and perfluoroalkyl vinyl ethers.

A polymerization method for manufacturing the above ion exchange resin precursor includes a solution polymerization method to dissolve the above fluorinated vinyl compounds in a solvent such as flons, then reacting and polymerizing with a fluorinated olefin gas; a block polymerization method to polymerize without using a solvent such as flons; and an emulsion polymerization method to emulsify a fluorinated vinyl compound by charging the compound in water together with a surfactant, then reacting and polymerizing with fluorinated olefin gas. An ion exchange resin precursor manufactured by the polymerization is represented by the following formula (1):

(1)

(wherein, $X^1$, $X^2$ and $X^3$ are independently a halogen atom or a perfluoroalkyl group with 1 to 3 carbon atoms, respectively; a is an integer of 0 to 20; b is an integer of 0 to 8; c is 0 or 1; d, e and f are independently an integer of 0 to 6, respectively, and d+e+f is not 0; g is an integer of 1 to 20; $R^1$ and $R^2$ are independently a halogen atom or a perfluoroalkyl group or a fluorochloroalkyl group with 1 to 10 carbon atoms; $X^5$ is $CO_2R^3$, $COR^4$ or $SO_2R^4$ wherein $R^3$ is a hydrocarbon type of alkyl group with 1 to 3 carbon atoms; $R^4$ is a halogen atom).

(Film-Formation of an Ion Exchange Resin Precursor)

Typical melt extrusion methods (T-die method, blowing method and calendaring method) are used to form the membrane of an ion exchange resin precursor. An alternative method includes a solvent casting method where a film is formed by casting a solution or dispersion of the above-described ion exchange resin precursor and a solvent is evaporated therefrom. In this method, the above-described dispersion may be cast on a porous membrane prepared by stretching a PTFE membrane as disclosed in JP-A-8-162132 or on a fibrillated fiber as disclosed in JP-A-53-149881 and JP-B-63-61337.

The ion exchange resin precursor membrane may be stretched and oriented in advance, although not limited in particular. In a case of film-formation by using a T-die melt extrusion method or a wet casting method, stretching and orientation can be furnished by using a tenter of lateral uniaxial type or a simultaneous biaxial type. Also, in a film-formation by a blowing method, stretching and orientation can easily be furnished by a known technology referred to as direct-blow or stretched-blow.

(Hydrolysis Treatment of an Ion Exchange Resin Precursor Membrane)

Then, the ion exchange resin precursor membrane, manufactured as described above, is subjected to a hydrolysis treatment by contacting with a reactive liquid. An example of the contacting method is coating the reactive liquid on the ion exchange resin precursor membrane. Said reactive liquid may be of any type, as long as it can be coated uniformly. Preferably, the reactive liquid has a high viscosity of at least 50 mPa·s, or a small surface tension, but is not particularly limited because the optimal condition depends on the contacting method of said reactive liquid. A method for raising the viscosity of said reactive liquid includes the addition of various types of thickening stabilizers. With regard to the surface tension of the latter, contact angle to a poly(tetrafluoroethylene) film, determined by the droplet method, is preferably at least 80° C., more preferably at least 70° C., and further more preferably at least 60° C. Practical methods to lower the surface tension include use of a non-aqueous type of reactive liquid, and lowering of water content. The surface tension can also be lowered by adding a surfactant, even when said reactive liquid is of an aqueous type.

Said reactive liquid is not particularly limited, but preferably basic and contains at least one kind of hydroxide of alkali metal or alkali earth metal, or basic nitrogen compounds. The hydroxide of alkali metal or alkali earth metal includes, but is not particularly limited to, potassium hydroxide and sodium hydroxide. The basic nitrogen compound includes, but is not particularly limited to, triethanolamine, diethanolamine, triethylamine and diethylamine. Content of the hydroxide of alkali metal or alkali earth metal or the basic nitrogen compound is not particularly limited, but is not less than 0.01% by weight and not more than 99% by weight, preferably not less than 2% by weight and not more than 40% by weight, more preferably not less than 5% by weight and not more than 35% by weight, and further more preferably not less than 10% by weight and not more than 30% by weight.

As a solvent to dissolve the hydroxide of alkali metal or alkali earth metal or the basic nitrogen compound contained in said reactive liquid, an aqueous and/or a non-aqueous solvent may be used. The content of such solvent is not particularly limited, but is not less than 0.01% by weight and not more than 99% by weight, preferably not less than 10% by weight and not more than 90% by weight, more preferably not less than 35% by weight and not more than 80% by weight, and further more preferably not less than 40% by weight and not more than 70% by weight.

The non-aqueous solvent may be of any type as long as it can dissolve the hydroxide of the alkali metal or alkali earth metal or the basic nitrogen compound. Among others, an organic solvent is preferable due to better wettablity than that of water. Typical corresponding examples include, but are not limited to, alcohols such as methanol, ethanol, 1-propanol, 2-propanol, 1-nonanol, 1-decanol, 1-undecanol, 1-dodecanol, benzyl alcohol, α-terpineol, ethylene glycol, 1,3-propanediol, 1,3-butanediol, 1,4-butanediol, 1,5-pentanediol, 2-butene-1,4-diol, 2-ethyl-1,3-hexanediol, glycerin and 2-ethyl-2-hydroxymethyl-1,3-propanediol; ethers such as dihexyl ether, butylphenyl ether, pentylphenyl ether, diphenyl ether, dibenzyl ether, veratorol, 1,2-dibutoxyethane, diethylene glycol dibutyl ether and glycerin ether. In particular, propanol and glycerin are preferable because they dissolve the hydroxide of alkali metals or alkali earth metals very well. Glycerin is particularly preferable due to the high boiling point of about 300° C., enabling one to raise the temperature of hydrolysis treatment. A higher temperature of hydrolysis treatment results in an improved hydrolysis reaction rate compared with the hydrolysis treatment using a conventional aqueous type of reactive liquid. Non-aqueous type here means that water content is not higher than 1% by weight. However, it may be preferable to use a mixture of aqueous/non-aqueous types by adding water thereto. For example, when the hydrolysis treatment temperature is around 100° C., the rate of the hydrolysis treatment reaction may be improved by adding water. In this case, water content is desirable, but not particularly limited, to be not less than 1% by weight and not more than 50% by weight, preferably not less than 2% by weight and not more than 40% by weight, more preferably not less than 5% by weight and not more than 30% by weight, and further more preferably not less than 10% by weight and not more than 20% by weight. Further, the hydrolysis treatment is also possible by immersing in a reactive liquid of a non-aqueous type or a mixture of aqueous/non-aqueous types.

Said reactive liquid may contain a swelling type of organic compound. It is known that use of a swelling type of organic compound in an aqueous solution of alkali hydroxide swells the resin layer of an ion exchange resin precursor, providing an effect in promoting the hydrolysis reaction as disclosed in JP-A-3-6240. A swelling type of organic compound includes, but is not limited to, dimethylsulfoxide, methanol, ethanol, propanol, triethanolamine, diethanolamine, isopropanolamine, diisopropanolamine, triisopropanolamine, dimethylaminoethanol, diethylaminoethanol and sulfolane. The content of the swelling type of organic compound is not particularly limited, but is not less than 0.01% by weight and not more than 99% by weight, preferably not less than 0.1% by weight and not more than 80% by weight, more preferably not less than 0.5% by weight and not more than 50% by weight, and further more preferably not less than 1% by weight and not more than 30% by weight.

The viscosity of said reactive liquid is not particularly limited, but may be not less than 50 mPa·s and not more than 100,000 mPa·s, preferably not less than 100 mPa·s and not more than 80,000 mPa·s, more preferably not less than 500 mPa·s and not more than 60,000 mPa·s, and further more preferably not less than 1000 mPa·s and not more than 50,000 mPa·s. Viscosity, here, is a value measured on said reactive liquid in the atmosphere at 20° C. using a conical plate type of rotary viscometer (hereinafter referred to as an E type of viscometer). In this case, said reactive liquid contains a thickening stabilizer. The thickening stabilizer includes, but is not particularly limited to, inorganic particles such as alumina and boron nitride; synthetic additive such as sodium alginate, propylene glycol alginate, sodium carboxymethylcellulose, potassium carboxymethylcellulose, sodium starch glycolate, sodium starch phosphate, poly(sodium acrylate) and methylcellulose; natural polysaccharides and/or derivatives thereof including polysaccharides obtained from seeds as raw material (such as guar gum, kajibu bean gum, taralia gum and tamarindus seed gum), polysaccharides obtained from resins or saps as raw material (such as Arabian gum, tragacanth gum and karaya gum), polysaccharides obtained from sea weed as raw material (such as alginic acid and carrageenan), polysaccharides obtained from fermentation products (such as xanthane gum, gellan gum and curdlan), plant extracts (peritin) and crustaceans extracts (such as chitin, chitosan and chitosamine). Further, the thickening stabilizer also includes polyether types of viscoelasticity modifiers, alkali thickening types of acrylic copolymer emulsions, poly(acrylic acid) types of viscoelasticity modifiers and condensation derivatives of D-sorbitol and benzaldehyde. Among others, polysaccharides and derivatives thereof are preferable due to superior alkali resistance. The content thereof is not particularly limited, but preferably 0.001 to 20% by weight, more preferably 0.01 to 10% by weight, and further more preferably 0.1 to 5% by weight. Further, the hydrolysis treatment can also be performed by immersing in a reactive liquid having a viscosity of at least 50 mPa·s.

Said reactive liquid may contain a surfactant to reduce the surface tension. The surface tension is preferably at least 80° C., more preferably at least 70° C., and further more preferably at least 60° C. as a contact angle on a polytetrafluoroethylene film measured by the droplet method. The surfactant includes, but is not particularly limited to, an anionic salt type of surfactant such as carboxylic acids, sulfonic acids, sulfuric acids and phosphoric acids; a cationic surfactant such as amine salts and ammonium salts; ampholytic surfactants such as carboxybetaine and aminocarboxylate salt types; and nonionic surfactants such as ether types, ether-ester types, ester types and nitrogen containing types. An anionic surfactant, in particular, is preferable because it exhibits a higher surfactant activity at a higher temperature. Further, a fluorocarbon type of surfactant, instead of a hydrocarbon type can also be used. The content thereof is not particularly limited, but is preferably 0.001 to 20% by weight, more preferably 0.01 to 10% by weight, and further more preferably 0.1 to 5% by weight. Moreover, the hydrolysis treatment can also be performed by immersion in the reactive liquid containing these surfactants.

Said reactive liquid may contain a film-forming agent to suppress volatilization of the reactive liquid after coating. Film-forming agents conforming to this object are not particularly limited, but are preferably an amphipatic molecule having both hydrophilic and hydrophobic moieties, and typically include protein and the like. In addition, film-forming agents such as sodium oleate and morpholine fatty acid salt are also suitable.

A method for coating said reactive liquid on said ion exchange resin precursor membrane is not particularly limited, so that any known coating technology can be used. Types of coaters includes reverse roll coaters, direct roll coaters, curtain coaters, fountain coaters, knife coaters and die coaters. Further, any known spraying technology can also be used as a coating method.

The amount to be coated is not particularly limited, but is preferably 1 g/m² to 9000 g/m², more preferably 50 g/m² to 1000 g/m², and further more preferably 100 g/m² to 500 g/m². Coating can be performed on either one side or both sides of said ion exchange resin precursor membrane, and the membrane may contain a non-coated part.

The hydrolysis treatment is performed by coating said reactive liquid, then heating said ion exchange resin precursor membrane at an optimal temperature. The treatment temperature is not particularly limited, but is not lower than 30° C. and not higher than 200° C., preferably not lower than 60° C. and not higher than 180° C., more preferably not lower than 70° C. and not higher than 150° C., and further more preferably not lower than 80° C. and not higher than 120° C. The treatment time depends on the treatment temperature or the composition of the reactive liquid and is not particularly limited, but is not shorter than 1 second and not longer than 10 hours, preferably not shorter than 10 seconds and not longer than 1 hour, more preferably not shorter than 10 seconds and not longer than 20 minutes, and further more preferably not shorter than 10 seconds and not longer than 10 minutes. The heating method is not particularly limited so that any known heating method can be used such as hot air heating and heating with a plate heater.

In addition, said precursor membrane and/or said ion exchange resin membrane is not particularly limited, but is desirably widened or stretched during and/or before or after the hydrolysis treatment. Here, stretching in the present invention means an elongation accompanied with generation of stretching stress, whereas an elongation without generating the stretching stress is referred to as widening. For example, if said precursor membrane is not stretched and oriented in advance, the membrane significantly swells in the horizontal direction due to water absorption during the hydrolysis treatment. An elongation of the membrane to an extent corresponding to this change is considered to be widening. The ratio of widening is not particularly limited, but is preferably 1.01 to 1.8 times, more preferably 1.05 to 1.7 times, and further more preferably 1.1 to 1.5 times in an area ratio. The ratio in the TD direction (a direction perpendicular to machine direction in continuous film production) in said area ratio is 1.01 to 1.6 times, preferably 1.03 to 1.5 times, more preferably 1.05 to 1.4 times, and further more preferably 1.1 to 1.3 times. Practical methods of widening include sliding the membrane on various rolls such as a drum roll (with a larger diameter at the center), a reversed crown roll (with a smaller diameter at the center) and a herringbone roll. Widening can also be performed by using a cross guider, web-spreader and tenter.

Surprisingly, an ion exchange resin membrane with high strength can also be manufactured by stretching said precursor membrane and/or said ion exchange resin membrane during and/or before or after the hydrolysis treatment to orient the molecular chains in a specific direction. The stretching ratio in this process is not particularly limited, but is preferably 1.1 to 100 times, more preferably 2 to 20 times, and further more preferably 4 to 16 times in area ratio. The ratio in the TD direction (a direction perpendicular to machine direction in continuous film production) in said area ratio is 1.1 to 100 times, preferably 1.2 to 10 times, more preferably 1.5 to 6 times, and further more preferably 2 to 4 times. The stretching temperature is not particularly limited, but is preferably 0 to 200° C. and more preferably 0 to 100° C. As such a stretching method, any known technology can be used, and uniaxial lateral stretching using a tenter, sequential biaxial stretching using a tenter and a longitudinal stretching roll and simultaneous biaxial stretching using a simultaneous biaxial tenter are desirable. When the constraint of said precursor is removed after stretching, the membrane may contract abruptly to generate an orientation relaxation. In such a case, an ion exchange resin membrane maintaining the oriented state and having a high strength can be obtained by subjecting the membrane to hydrolysis treatment under the constrained condition after stretching. Constraint in the present invention means a constraint to prevent spontaneous relaxation of stretching and orientation by thermal shrinkage of the membrane, and includes not only a constraint under a fixed dimension but also a constraint under stretching. One of the most desirable methods in the present invention is to provide stretching to said precursor membrane before coating said reactive liquid, followed by coating said reactive liquid under the constraint while maintaining the state, and thus performing the hydrolysis treatment.

(Ion Exchange Resin Membrane)

An ion exchange resin membrane of the present invention having an alkali metal type of ion exchange group or an alkali earth metal type of ion exchange group, represented by the following formula (2) (wherein, Z is an alkali metal atom or an alkali earth metal atom) can be obtained by performing a hydrolysis treatment of an ion exchange resin precursor membrane, followed by washing with water. An ion exchange resin membrane of the present invention having an acid type of ion exchange group (a proton type of ion exchange resin membrane), represented by the following formula (2) (wherein, Z is a hydrogen atom) can also be manufactured by further treating with an inorganic acid such as hydrochloric acid.

(2)

(wherein, $X^1$, $X^2$ and $X^3$ are independently a halogen atom or a perfluoroalkyl group with 1 to 3 carbon atoms, respectively; a is an integer of 0 to 20; b is an integer of 0 to 8; c is 0 or 1; d, e and f are independently an integer of 0 to 6, respectively; and d+e+f is not equal to 0; g is an integer of 1 to 20; $R^1$ and $R^2$ are independently a halogen atom or a perfluoroalkyl group or a fluorochloroalkyl group with 1 to 10 carbon atoms, respectively; $X^4$ is COOZ or $SO_3Z$ with Z being an alkali metal atom, an alkali earth metal atom or a hydrogen atom).

Furthermore, the proton type of ion exchange resin membrane can also be manufactured by coating the ion exchange resin precursor membrane with an acidic liquid just after the hydrolysis treatment as described above without washing with water. An acidic liquid here desirably includes, but is not particularly limited to, an aqueous solution containing inorganic acid such as hydrochloric acid, sulfuric acid, nitric acid and phosphoric acid. The content of the acid is not particularly limited, but is not less than 0.01% by weight and not more than 90% by weight, preferably not less than 0.1% by weight and not more than 50% by weight, more preferably not less than 1% by weight and not more than 30% by weight, and further more preferably not less than 2% by weight and not more than 15% by weight. Said acidic liquid is not particularly limited, but it preferably contains the above-described thickening stabilizer to be viscous.

The equivalent weight of the ion exchange resin membrane manufactured in accordance with a method of the present invention, that is, dry weight per 1 equivalent of the ion exchange group, EW, is not particularly limited, but is suitably not less than 250 and not more than 1,500, preferably not less than 400 and not more than 1,400, more preferably not less than 500 and not more than 1,300, and further more preferably not less than 600 and not more than 1,200. The thickness of the membrane is not particularly limited, but is preferably not thinner than 1 μm and not thicker than 500 μm.

(Membrane/Electrode Assembly)

When an ion exchange resin membrane manufactured in accordance with a method of the present invention is employed in a solid polymer type of fuel cell, it is used as a membrane/electrode assembly (MEA) having two kinds of electrodes, that is, an anode and a cathode assembled on both sides of the membrane. The electrode is composed of fine particles of a catalyst metal and a conductive agent carrying them, and additionally contains a water repellant, if necessary. The catalyst used in the electrode is not particularly limited, as long as it is a metal to promote an oxidative reaction of hydrogen and a reductive reaction of oxygen, and includes platinum, gold, silver, palladium, iridium, rhodium, ruthenium, iron, cobalt, nickel, chromium, tungsten, manganese and vanadium and alloys thereof. Among them, platinum is mainly used. The MEA is prepared from the electrodes and the ion exchange resin membrane described above by, for example, the following method. An ion exchange resin is dissolved in a mixed solvent of alcohol and water to prepare a solution, in which carbon carrying platinum, as an electrode material, is dispersed to make a paste-like substance. This paste is then coated on PTFE sheets in a specified amount and dried. Then, said PTFE sheets are placed so that the coated surfaces are in opposing positions with the ion exchange resin membrane being sandwiched between the coated surfaces, followed by transferring and bonding thereof using a hot press. The temperature of the hot press depends on the type of ion exchange resin membrane, but usually is at least 100° C., preferably at least 130° C., and more preferably at least 150° C.

(Fuel Cell)

Solid polyelectrolyte type fuel cells are composed of a MEA, current collector, fuel cell frame, gas feed equipment and the like. A current collector (bipolar plate) is a flange made of graphite or metal, having gas passage at the surface and the like, which has the function at transferring electrons to an external load circuit and supplying hydrogen or oxygen to the MEA surface. A fuel cell is prepared by inserting MEA between current collectors and piling up a plurality of the laminates. The fuel cell is operated by feeding hydrogen to one electrode, while feeding oxygen or air to another electrode. A higher operation temperature of a fuel cell is preferable because the catalytic activity is more enhanced, but the temperature is usually 50 to 100° C. due to easy control of water content, and in a certain case the operation may be carried out at 100 to 150° C. A higher feed pressure of oxygen or hydrogen is preferable due to increased output of the fuel cell, but the pressure is preferably adjusted in a suitable pressure range to reduce the probability of contact of both materials caused by a membrane failure and the like.

The ion exchange resin membrane manufactured in accordance with a method of the present invention can be used in various applications including solid polymer types of fuel cell and others such as in the chlorine-alkali industry; electrolysis of water, hydrogen halide acid and sodium chloride; oxygen concentrator; humidity sensor; and gas sensor.

The present invention will be described in more detail based on Examples but the present invention should not be restricted by these Examples. The evaluation methods used in the Examples are as follows.

(FT-IR Measurement)

An "FT/IR-300E" made by JASCO Research Ltd. was used. A membrane sample having a size of 3 cm×3 cm was set in a holder to perform a measurement by the transmission method. The completion of the hydrolysis treatment was judged from the presence of a peak around 1,470 cm$^{-1}$, which was assigned to an ester stretching vibration. Complete disappearance of this peak was regarded as completion of the hydrolysis treatment.

(Viscosity Measurement)

An E type of viscometer, "VISCONIC Model ED" made by TOKIMEC INC. was used to measure viscosity at room temperature. As a rotor, a standard corn (1° 34') was used. About 1 ml of each reactive liquid (20° C.) was collected and put in a sample cup, which was then fitted to a main body of the viscometer. The revolution speed of the rotor was appropriately adjusted to meet the viscosity of each reactive liquid.

(Contact Angle Measurement)

An automatic contact angle meter, "Model CA-V" made by Kyowa Kaimen Kagaku Co. Ltd. was used to measure a contact angle at room temperature and the θ/2 method was used for analysis. "Naflon tape" (registered trademark of a product made by Nichias Corp.) with a thickness of 200 μm, as a polytetrafluoroethylene film, was cut out into a 1 cm×5 cm size and plastered on a glass plate. Each reactive liquid was injected from a syringe on the "Naflon tape" to form a droplet, which was analyzed by image processing after standing for 10 seconds to determine a diameter (2r) and a height (h) thereof. The contact angle was calculated by the following equation:

$$\theta = 2 \tan^{-1}(h/r).$$

(Observation of Liquid State)

After the coating of a reactive liquid at 20° C., a state of liquid was observed by visual inspection to determine the ratio of a liquid area after standing for 1 minute to a coated area. The liquid area ratio at completion of hydrolysis treatment was also determined (when the liquid was completely dried-up, the area just before being dried-up was used). A ratio state of not lower than 90% was ranked as ◯, a ratio state not lower than 50% and below 90% as ranked as Δ, and a ratio state not higher than 50% or when the liquid was repelled and split into multiple droplets was ranked as X.

(Measurement of Proton Conductivity)

Membrane samples were cut out in wet state to measure the thickness T. A membrane sample having a size of 1 cm in width×5 cm in length was set in a 2-terminals type of cell for conductivity measurement to measure conductivity along the longitudinal direction. The cell was immersed in ion exchanged water at 80° C. to measure a real number component of resistance R under a frequency of 10 kHz by the A.C. impedance method. Proton conductivity σ was derived by the following equation:

$$\sigma = L/(R \times T \times W)$$

σ: Proton conductivity (S/cm)
T: Thickness (cm)
R: Resistance (Ω)
L: Membrane length (cm) (5 cm)
W: Membrane width (cm) (1 cm)

(Evaluation of Fuel Cell)

A solution of 5% by weight of perfluorosulfonic acid polymer (made by Asahi Kasei Corp., EW=910, solvent composition is ethanol/water=50/50) was coated on gas diffusion electrodes (ELAT, Pt carrying amount of 0.4 mg/cm$^2$) made by DE NORA NORTH AMERICA Inc., E-TEK division, USA ., U.S.A., followed by drying and solidifying in a 120° C. atmosphere to obtain electrodes with a polymer carrying amount of 0.8 mg/cm$^2$. Two electrodes were placed in opposing positions with a membrane sample between them, then hot pressed at 15° C. under a pressure of 50 kg/cm$^2$ to prepare a MEA. The MEA was fitted to evaluation equipment for a unit fuel cell, in which hydrogen gas as a fuel and air gas as an oxidizing agent were fed while being humidified at 80° C. and room temperature, respectively, using the water bubbling system. Unit cell performances were tested at a cell temperature of 80° C. under normal pressure to obtain current-voltage curves.

EXAMPLE 1

A fluorocarbon copolymer (EW: 950) of $CF_2CF_2$ and $CF_2=CFOCF_2CF(CF_3)O(CF_2)_2$—$SO_2F$ was prepared as an ion exchange resin precursor. This copolymer was melt extruded by the T-die method to form an ion exchange resin precursor membrane with a thickness of 38 μm. This ion exchange resin precursor membrane was then cut out into pieces of about 20 cm×20 cm, which were stretched by 10% in the MD direction (extruder machine direction in film-formation) and 20% in the TD direction (perpendicular to MD direction), respectively, followed by being constrained by a frame.

A reactive liquid used for the hydrolysis treatment was prepared as follows. First, 5 g of DKS Finegum G-270 made by Dai-ichi Kogyo Yakuhin K.K. was dissolved in 100 g of deionized water, while stirred with a "Three-One" motor. Then, to 24.7 g of this solution (hereinafter, referred to as a G-270 aqueous solution), an aqueous solution of 15 g of potassium hydroxide (hereinafter, KOH) in 9 g of deionized water, then 5 g of dimethylsulfoxide (hereinafter, DMSO) were added to prepare a reactive liquid. This reactive liquid had a liquid composition of KOH/water/DMSO/G-270=28.0/61.0/9.0/2.0 (ratio by weight) and a viscosity of 10,624 mPa·s.

Figure 1:
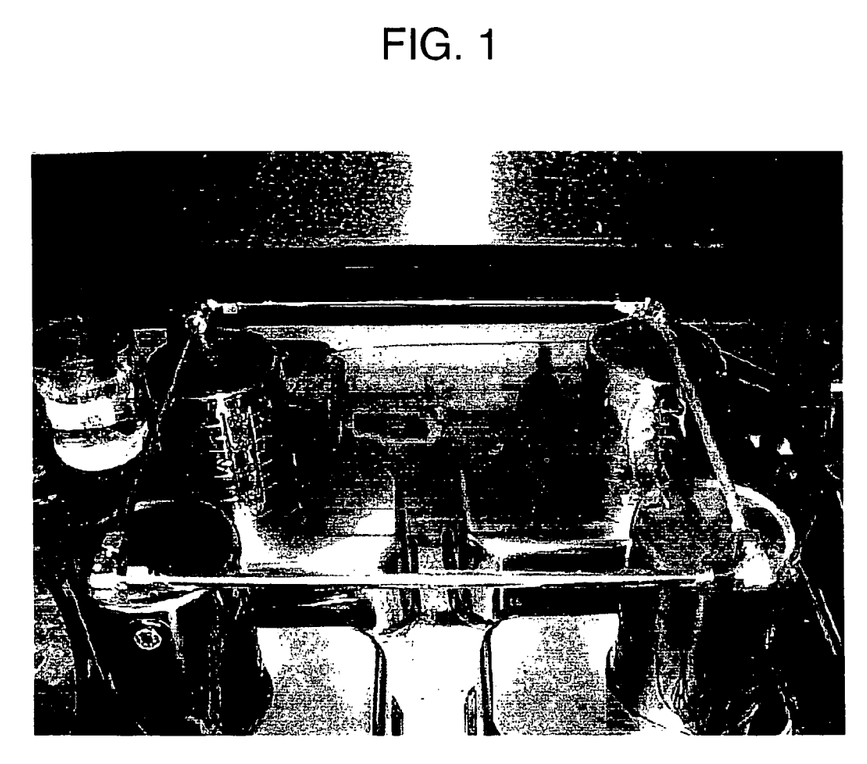
FIG. 1 is a photograph showing hydrolysis treatment for an ion exchange resin precursor membrane in Example 1.

The obtained reactive liquid was coated on one surface of the ion exchange resin precursor membrane, constrained as described above, at a width of 5 cm and a thickness of 200 μm using a doctor blade. The state of the liquid during coating was at a level of ○. The ion exchange resin precursor membrane, constrained as described above, was placed under a panel heater to heat the coated part so as to hydrolyze at a membrane surface temperature of 90° C. for 5 minutes. The state of the liquid during the hydrolysis treatment was also at a level of ○. FIG. 1 shows the appearance at this stage. No wrinkle was found by visual inspection of the surface of the ion exchange resin membrane, after cutting out, washing and drying the coated area. A FT-IR measurement showed completion of the hydrolysis treatment. The results are shown in Table 1.

EXAMPLE 2

The precursor membrane was cut in pieces of about 20 cm×20 cm, which were stretched by 15% in the MD direction and 30% in the TD direction, respectively, followed by being constrained by a frame, in the same manner as in Example 1. A reactive liquid used for hydrolysis treatment was prepared by adding a solution of 15.0 g of KOH in 12.5 g of deionized water to 21.4 g of an aqueous G-270 solution, followed by further adding 4.80 g of DMSO. The reactive liquid had a liquid composition of KOH/water/DMSO/G-270=28.0/61.1/9.0/1.9 (ratio by weight) and a viscosity of 7,040 mPa·s. Both sides of the ion exchange resin precursor membrane constrained as described above were coated with this reactive liquid in an area of 15 cm×15 cm with a thickness of 100 μm using a doctor blade. The state of the liquid during the coating was at a level of ○. Then on both sides of this ion exchange resin precursor membrane, panel heaters were placed to heat the coated areas so as to hydrolyze at a membrane surface temperature of 90° C. for 5 minutes. The state of the liquid during the hydrolysis treatment was also at a level of ○. After washing with deionized water at 80° C. and drying, the hydrolyzed area was cut to 10 cm×10 cm. A visual inspection of the surface of the ion exchange resin membrane showed a clear state without wrinkle, and being ranked at a level of ○. A FT-IR measurement showed completion of the hydrolysis treatment. The above results are shown in Table 1.

Figure 2:
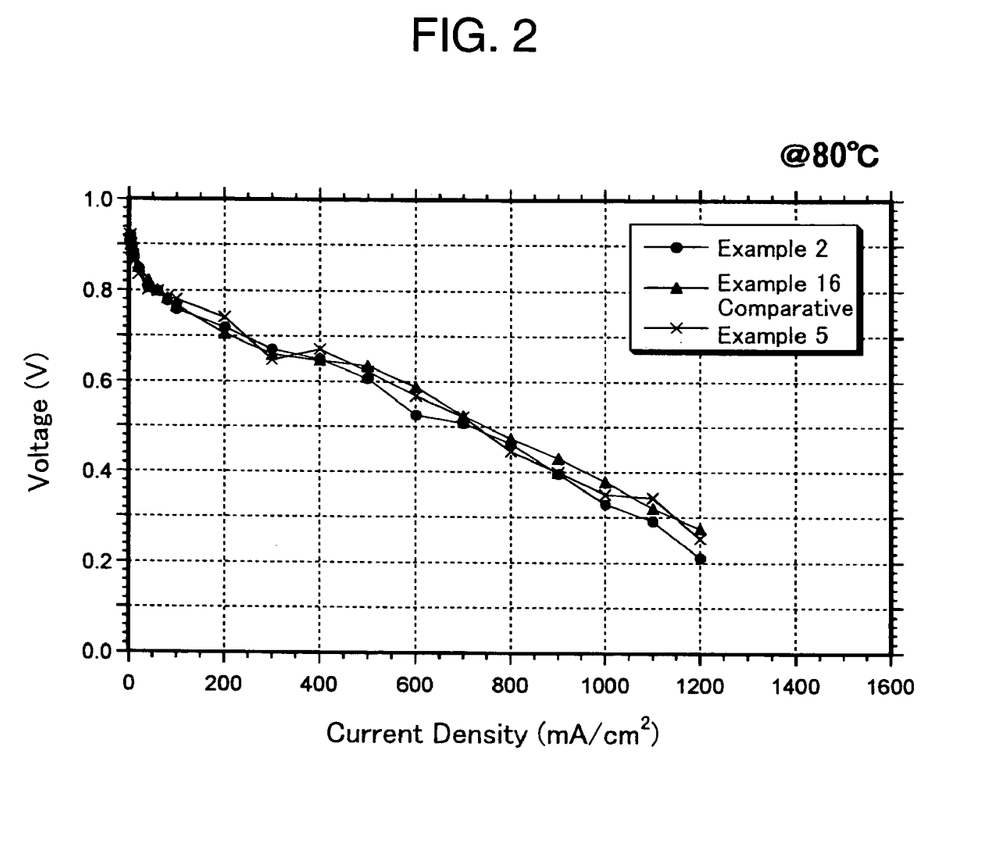
FIG. 2 is a current-voltage curve based on results of an evaluation of a fuel cell.

This ion exchange resin membrane was also immersed in a 2N HCl aqueous solution at 60° C. for 1 hour, to convert it to a proton type of membrane, which was evaluated as a fuel cell. The results showed good power generation characteristics equivalent to those in the Comparative Example. FIG. 2 shows a current-voltage curve at this time.

EXAMPLE 3

A hydrolysis treatment was performed as in Example 2, except that a reactive liquid having a composition of KOH/water/DMSO/G-270=28.0/61.2/9.0/1.8 (ratio by weight) and a viscosity of 3,277 mPa·s was used. The state of the liquid during the coating and the hydrolysis treatment were both at a level of ○. Visual inspection of the surface of the ion exchange resin membrane thus obtained showed a clear state without wrinkle being ranked at a level of ○. A FT-IR measurement showed completion of hydrolysis treatment. The above results are shown in Table 1.

EXAMPLE 4

A hydrolysis treatment was performed as in Example 2, except that a reactive liquid having a composition of KOH/water/DMSO/G-270=28.0/61.3/9.0/1.7 (ratio by weight) and a viscosity of 1,000 mPa·s was used. The state of the liquid during the coating and the hydrolysis treatment were both at a level of ○. A visual inspection of the surface of the ion exchange resin membrane thus obtained showed a clear state without wrinkle being ranked at a level of ○. A FT-IR measurement showed completion of the hydrolysis treatment. The above results are shown in Table 1.

EXAMPLE 5

A hydrolysis treatment was performed as in Example 2, except that a reactive liquid having a composition of KOH/water/DMSO/G-270=28.0/62.0/9.0/1.0 (ratio by weight) and a viscosity of 86 mPa·s was used. The state of the liquid during the coating was at a level of ○, but the state of the liquid during the hydrolysis treatment was ranked at a level of Δ, because a certain extent of liquid contraction was found. A visual inspection of the surface of the ion exchange resin membrane thus obtained showed a clear state without wrinkle being ranked at a level of ○. A FT-IR measurement showed completion of the hydrolysis treatment. The above results are shown in Table 1.

EXAMPLE 6

A hydrolysis treatment was performed as in Example 2, except that a reactive liquid having a composition of KOH/water/DMSO/G-270=15.0/74.0/9.0/2.0 (ratio by weight) and a viscosity of 1,357 mPa·s was used. The state of the liquid during the coating and the hydrolysis treatment were both at a level of ○. A visual inspection of a surface of the ion exchange resin membrane thus obtained showed a clear state without wrinkle being ranked at a level of ○. A FT-IR measurement showed completion of the hydrolysis treatment. The above results are shown in Table 1.

EXAMPLE 7

A hydrolysis treatment was performed as in Example 2, except that a reactive liquid-having a composition of KOH/water/DMSO/G-270=15.0/74.1/9.0/1.9 (ratio by weight) and a viscosity of 755 mPa·s was used. The states of the liquid during the coating and the hydrolysis treatment were both at a level of ○. A visual inspection of the surface of the ion exchange resin membrane thus obtained showed a clear state without wrinkle being ranked at a level of ○. A FT-IR measurement showed completion of the hydrolysis treatment. The above results are shown in Table 1.

EXAMPLE 8

Example 2, except that a reactive liquid having a composition of KOH/water/DMSO/G-270=15.0/74.5/9.0/1.5 (ratio by weight) and a viscosity of 301 mPa·s was used. The states of the liquid during the coating and the hydrolysis treatment were both at a level of ○. A visual inspection of a surface of the ion exchange resin membrane thus obtained showed a clear state without wrinkle being ranked at a level of ○. A FT-IR measurement showed completion of the hydrolysis treatment. The above results are shown in Table 1.

EXAMPLE 9

A hydrolysis treatment was performed as in Example 2, except that a reactive liquid having a composition of KOH/water/DMSO/G-270=15.0/75.0/9.0/1.0 (ratio by weight) and a viscosity of 77 mPa·s was used. The state of the liquid during the coating was at a level of ○, but the state of the liquid during the hydrolysis treatment was ranked at a level of Δ, because a certain extent of liquid contraction was found. A visual inspection of a surface of the ion exchange resin membrane thus obtained showed a clear state without wrinkle being ranked at a level of ○. A FT-IR measurement showed completion of the hydrolysis treatment. The above results are shown in Table 1.

EXAMPLE 10

In 100 g of deionized water, 25 g of "DKS Finegum G-1" made by Dai-ichi Kogyo Yakuhin K.K. was dissolved, while stirred with the "Three-One" motor. To 29.4 g of this solution, an aqueous solution of 15 g of KOH in 9 g of deionized water, then further 5 g of DMSO were added to obtain a reactive liquid. This reactive liquid had a liquid composition of KOH/water/DMSO/G-1=25.7/55.7/8.6/10.0 (ratio by weight) and a viscosity of 2500 mPa·s.

A hydrolysis treatment was performed as in Example 2. The state of the liquid during the coating and the hydrolysis treatment were both at a level of ○. A visual inspection of the surface of the ion exchange resin membrane thus obtained showed a clear state without wrinkle being ranked at a level of ○. A FT-IR measurement showed completion of the hydrolysis treatment. The above results are shown in Table 1.

EXAMPLE 11

10 g of KOH was dissolved in 40 g of glycerin, while stirred at 120° C. To this solution, 50 g of DMSO was added to prepare a reactive liquid. This reactive liquid had a liquid composition of KOH/glycerin/DMSO=10/40/50 (ratio by weight), a viscosity of 128 mPa·s and a contact angle of 61°.

This reactive liquid was coated at a thickness of 300 μm on one side of the ion exchange resin precursor membrane having a thickness of 25 μm, prepared as in Example 1. The membrane was then hydrolyzed in an oven at 150° C. for 10 minutes. The state of the liquid during the coating and the hydrolysis treatment were both at a level of ○. A FT-IR measurement of the ion exchange resin membrane obtained showed completion of the hydrolysis treatment. The above results are shown in Table 1.

EXAMPLE 12

To 50 g of the reactive liquid used in Example 11, 2.5 g of fine particles of aluminum oxide (hereinafter, referred to as alumina) made by Nippon Aerosil Co., Ltd. was added and stirred. This reactive liquid had a liquid composition of KOH/glycerin/DMSO/alumina=9/38/48/5 (ratio by weight) and a viscosity of 1,024 mPa·s.

A hydrolysis treatment was performed as in Example 11 using this reactive liquid. The state of the liquid during the coating and the hydrolysis treatment were both at a level of ○. A FT-IR measurement of the ion exchange resin membrane obtained showed completion of the hydrolysis treatment. The above results are shown in Table 1.

EXAMPLE 13

5 g of KOH was dissolved in 50 g of 1-propanol, while stirred. To this solution, 45 g of DMSO was added to prepare a reactive liquid. This reactive liquid had a liquid composition of KOH/1-propanol/DMSO=5/50/45 (ratio by weight) and a contact angle of 38°.

This reactive liquid was coated in a thickness of 300 μm on one side of the ion exchange resin precursor membrane having a thickness of 25 μm, prepared as in Example 1. The membrane was then left at 20° C. for 12 hours. The state of the liquid during the coating and the hydrolysis treatment were both at a level of ○. A FT-IR measurement of the ion exchange resin membrane obtained showed completion of the hydrolysis treatment. The above results are shown in Table 1.

EXAMPLE 14

An aqueous solution of 15 g of KOH in 54 g of deionized water was further added with 30 g of DMSO. To this solution, 1 g of a surfactant "SN Wet 970" made by San Nopco Ltd. (hereinafter, referred to as SN970) was added to prepare a reactive solution. This reactive liquid had a liquid composition of KOH/water/DMSO/SN970=15/54/30/1 (ratio by weight) and a contact angle of 54°.

Hydrolysis treatment was performed using this reactive liquid, as in Example 13. The state of the liquid during the coating and the hydrolysis treatment were both at a level of ○. A FT-IR measurement of the ion exchange resin membrane obtained showed completion of the hydrolysis treatment. The above results are shown in Table 1.

TABLE 1

| | Composition of Liquid | | | | Physical Properties of Liquid | | Observation of Liquid State | | After Hydrolysis | |
|---|---|---|---|---|---|---|---|---|---|---|
| | KOH wt % | Solvent wt % | DMSO wt % | Others wt % | Viscosity mPa·s | Contact Angle ° | After Coating | After Treatment | FT-IR | State |
| Example 1 | 28.0 | Water: 61.0 | 9.0 | G-270: 2.0 | 10,624 | — | ○ | ○ | Completed | ○ |
| Example 2 | 28.0 | Water: 61.1 | 9.0 | G-270: 1.9 | 7,040 | — | ○ | ○ | Completed | ○ |
| Example 3 | 28.0 | Water: 61.2 | 9.0 | G-270: 1.8 | 3,277 | — | ○ | ○ | Completed | ○ |
| Example 4 | 28.0 | Water: 61.3 | 9.0 | G-270: 1.7 | 1,000 | — | ○ | ○ | Completed | ○ |
| Example 5 | 28.0 | Water: 62.0 | 9.0 | G-270: 1.0 | 86 | — | ○ | Δ | Completed | ○ |
| Example 6 | 15.0 | Water: 74.0 | 9.0 | G-270: 2.0 | 1,357 | — | ○ | ○ | Completed | ○ |
| Example 7 | 15.0 | Water: 74.1 | 9.0 | G-270: 1.9 | 755 | — | ○ | ○ | Completed | ○ |
| Example 8 | 15.0 | Water: 74.5 | 9.0 | G-270: 1.5 | 301 | — | ○ | ○ | Completed | ○ |

TABLE 1-continued

| | Composition of Liquid | | | | Physical Properties of Liquid | | Observation of Liquid State | | After Hydrolysis | |
|---|---|---|---|---|---|---|---|---|---|---|
| | KOH wt % | Solvent wt % | DMSO wt % | Others wt % | Viscosity mPa·s | Contact Angle ° | After Coating | After Treatment | FT-IR | State |
| Example 9 | 15.0 | Water: 75.0 | 9.0 | G-270: 1.0 | 77 | — | ○ | Δ | Completed | ○ |
| Example 10 | 25.7 | Water: 55.7 | 8.6 | G-1: 10 | 2,500 | — | ○ | ○ | Completed | ○ |
| Example 11 | 10 | Glycerin: 40 | 50 | — | 128 | 61 | ○ | ○ | Completed | — |
| Example 12 | 9 | Glycerin: 38 | 48 | Alumina: 5 | 1,024 | — | ○ | ○ | Completed | — |
| Example 13 | 5 | 1-Propanol: 50 | 45 | — | — | 38 | ○ | ○ | Completed | — |
| Example 14 | 15 | Water: 54 | 30 | SN970: 1 | — | 54 | ○ | ○ | Completed | — |
| Comparative Example 1 | 15 | Water: 55 | 30 | — | 8 | 81 | X | X | Not Completed | X |
| Comparative Example 2 | 30 | Water: 65 | 5 | — | 24 | 84 | X | X | Not Completed | X |

COMPARATIVE EXAMPLE 1

A reactive liquid containing 15% by weight of KOH, 30% by weight of DMSO and 55% by weight of water was prepared. The viscosity thereof was 8 mPa·s. The reactive liquid was coated on the same ion exchange resin precursor membrane as that in Example 1, which was stretched and in a constrained state as in Example 1, but uniform wetting was not attained and the liquid showed a contraction. The state of the liquid during the coating was at a level of X. During the hydrolysis treatment as in Example 1 at 90° C. for 5 minutes, the liquid was repelled and split into multiple droplets. The state of the liquid during the hydrolysis treatment was also at a level of X. After the hydrolysis treatment, the coated membrane area was cut out, washed with water and dried. A visual inspection of the surface of the ion exchange resin membrane showed that a pockmark-like hydrolysis occurred as well as generation of wrinkles. A FT-IR measurement showed that the hydrolysis treatment was not completed. The above results are shown in Table 1.

COMPARATIVE EXAMPLE 2

A reactive liquid containing 30% by weight of KOH, 5% by weight of DMSO and 65% by weight of water was prepared. A viscosity thereof was 24 mPa·s. The reactive liquid was coated on the same ion exchange resin precursor membrane as that in Example 1, which was stretched and in a constrained state as in Example 1, but uniform wetting was not attained and the liquid showed contraction. The state of the liquid during the coating was at a level of X. During the hydrolysis treatment as in Example 1 at 90° C. for 5 minutes, the liquid was repelled and split into multiple droplets. The state of the liquid during hydrolysis treatment was also at a level of X. The appearance at this time is shown in FIG. 3. After the hydrolysis treatment, the coated membrane area was cut out, washed with deionized water and dried. A visual inspection of a surface of the ion exchange resin membrane showed that a pockmark-like hydrolysis occurred as well as generation of wrinkles. A FT-IR measurement showed that the hydrolysis treatment was not completed. The above results are shown in Table 1.

As shown above, an increase in viscosity of the reactive liquid enables a uniform coating on the ion exchange resin precursor membrane, as well as a uniform hydrolysis treatment in a short period. Further, the use of a non-aqueous type of reactive liquid or an addition of a surfactant to the aqueous type of reactive liquid can also dramatically improve wettability thereof, which leads to a uniform coating on the above-described precursor membrane to perform the hydrolysis treatment successfully. Still further, by performing the hydrolysis treatment of the ion exchange resin membrane under constraint while maintained in a widened or stretched state, a uniform hydrolysis treatment can be attained without suffering defects such as wrinkle and sag.

Next, a method for manufacturing a proton type of ion exchange resin membrane obtained by coating an acidic liquid on the ion exchange resin membrane manufactured as described above will be described using Examples.

EXAMPLE 15

An acidic liquid was prepared by adding an aqueous hydrochloric acid solution from 14 g of 36% concentrated hydrochloric acid diluted with 44 g of deionized water to 42 g of the same aqueous solution of G-270 as that in Example 1. This acidic liquid had a composition of HCl/water/G-270=5/93/2 (ratio by weight) and a viscosity of 1,000 mPa·s. This acidic solution was coated at a thickness of 500 μm on both sides of the ion exchange resin membrane, which was subjected to the hydrolysis treatment as in Example 6 but without washing with water. After hydrolyzing by leaving the membrane standing at 30° C. for 10 minutes, the membrane was washed with deionized water at 80° C., dried, and the coated area was cut-out. A visual inspection of the surface of the ion exchange resin membrane showed a clear state without wrinkle. A FT-IR measurement showed completion of the hydrolysis treatment. The proton conductivity at 20° C. was 0.06 S/cm.

Next, Examples of the hydrolysis treatment by immersing in a non-aqueous type of reactive liquid will be described.

EXAMPLE 16

The same copolymer as that in Example 1 was melt extruded to obtain an ion exchange resin precursor membrane with a thickness of 50 μm. This ion exchange resin precursor membrane was cut out to pieces of about 10 cm×10 cm, which were immersed in a reactive liquid containing 10% by weight of KOH, 40% by weight of glycerin and 50% by weight of DMSO, to perform the hydrolysis treatment at 180° C. for 3 minutes. After the reaction, the membrane was washed with water then dried. A FT-IR measurement on the membrane showed completion of the hydrolysis treatment.

Further, in a visual inspection, the membrane also showed no irregularity in the hydrolysis and was ranked at a level of ○. Still further, this ion exchange resin membrane was further treated with aqueous 2N HCl solution to measure proton conductivity at 80° C. The results obtained are shown in Table 2. In addition, an evaluation of the fuel cell showed good power generation characteristics equivalent to the Comparative Example 3. FIG. 2 shows a current-voltage curve of this time.

COMPARATIVE EXAMPLE 5

An ion exchange resin membrane was prepared using the same ion exchange resin precursor membrane as that in Example 16, except that the hydrolysis treatment was performed at 90° C. for 3 minutes using a reactive liquid containing 30% by weight of KOH, 5% by weight of DMSO and 65% by weight of water. A FT-IR measurement showed that the hydrolysis treatment was not completed. The results are shown in Table 2.

TABLE 2

| | Composition of Reactive Liquid | | | | Reaction Condition | | | |
|---|---|---|---|---|---|---|---|---|
| | KOH wt % | Glycerin wt % | DMSO wt % | Water wt % | Temperature ° C. | Time min | FT-IR | Conductivity S/cm |
| Example 16 | 10 | 40 | 50 | — | 180 | 3 | Reaction Completed | 0.21 |
| Example 17 | 15 | 60 | 25 | — | 150 | 6 | Reaction Completed | — |
| Comparative Example 3 | 30 | — | 5 | 65 | 90 | 10 | Reaction Completed | 0.21 |
| Comparative Example 4 | 15 | — | 30 | 55 | 90 | 3 | Reaction Not Completed | — |
| Comparative Example 5 | 30 | — | 5 | 65 | 90 | 3 | Reaction Not Completed | — |

EXAMPLE 17

An ion exchange resin membrane was prepared using the same ion exchange resin precursor membrane as that in Example 16, except that the hydrolysis treatment was performed at 150° C. for 6 minutes using a reactive liquid containing 15% by weight of KOH, 60% by weight of glycerin and 25% by weight of DMSO. A FT-IR measurement showed completion of the hydrolysis treatment. A visual inspection showed a uniform hydrolysis treatment without an irregularity and membrane was ranked at a level of ○. The results obtained are shown in Table 2.

COMPARATIVE EXAMPLE 3

An ion exchange resin membrane was prepared using the same ion exchange resin precursor membrane as that in Example 16, except that the hydrolysis treatment was performed at 90° C. for 10 minutes using a reactive liquid containing 30% by weight of KOH, 5% by weight of DMSO and 65% by weight of water. A FT-IR measurement showed completion of the hydrolysis treatment. This membrane was further treated with aqueous 2N HCl solution to measure the proton conductivity. The results obtained are shown in Table 2. FIG. 2 shows a current-voltage curve obtained in the evaluation of a fuel cell.

COMPARATIVE EXAMPLE 4

An ion exchange resin membrane was prepared using the same ion exchange resin precursor membrane as that in Example 16, except that the hydrolysis treatment was performed at 90° C. for 3 minutes using a reactive liquid containing 15% by weight of KOH, 30% by weight of DMSO and 55% by weight of water. A FT-IR measurement showed that the hydrolysis treatment was not completed. The results are shown in Table 2.

As shown above, the non-aqueous reactive liquid can also be applied to the immersion method and enables it to perform the hydrolysis treatment at a temperature of at least 100° C., and thereby reduces the time required for the hydrolysis treatment.

INDUSTRIAL APPLICABILITY

As described above, use of a method for manufacturing an ion exchange resin membrane in accordance with the present invention enables the hydrolysis treatment of an ion exchange resin precursor membrane in a short time without immersing it in an alkaline bath, which causes problems such as complicated management and control and discharge of a large quantity of industrial waste, and thus enables the Manufacture of a high quality ion exchange resin membrane. A reactive liquid used in the present invention can also be applied to a hydrolysis treatment by immersing in an alkaline bath.

The invention claimed is:

1. A method for manufacturing an ion exchange resin membrane by contacting an ion exchange resin precursor membrane having an ion exchange group precursor with a reactive liquid thereby to hydrolyze said ion exchange group precursor, comprising the steps of widening or stretching said precursor membrane and/or said ion exchange resin membrane, and coating said reactive liquid on said precursor membrane;
   wherein said reactive liquid contains an alkali metal, alkali earth metal or basic nitrogen compound of 2 to 40% by weight, a swelling type of organic compound of 1 to 30% by weight, and a thickening stabilizer of 0.01 to 10% by weight, and has a viscosity of at least 50 mPa·s at 20° C. under atmospheric pressure.

2. The method in accordance with claim 1, wherein said thickening stabilizer is a polysaccharide(s) and/or a derivative(s) thereof.

3. The method in accordance with claim 1, wherein said reactive liquid contains a surfactant.

4. The method in accordance with claim 1, wherein said reactive liquid contains a non-aqueous type of reactive liquid as a main component.

5. The method in accordance with claim 1, wherein said reactive liquid contains a film-forming agent.

6. The method in accordance with claim 1, comprising after said widening or stretching step maintaining said precursor membrane and/or said ion exchange resin membrane under constrained conditions.

7. A method for manufacturing a proton type ion exchange resin membrane by contacting an ion exchange resin membrane with an acidic liquid, comprising subjecting said ion exchange resin precursor membrane to a hydrolysis treatment by the method in accordance with claim 1, and subsequently coating an acidic liquid on said membrane.

8. A method for manufacturing an ion exchange resin membrane by contacting an ion exchange resin precursor membrane having an ion exchange group precursor with a reactive liquid thereby to hydrolyze said ion exchange group precursor, wherein said reactive liquid is composed of a non-aqueous solvent containing no water, wherein said non-aqueous solvent dissolves hydroxides of alkali metals or alkaline earth metals, or basic nitrogen compounds.

9. The method in accordance with claim 8, wherein said non-aqueous type reactive liquid has a boiling point above 100° C.

10. The method in accordance with claim 8, comprising coating said reactive liquid on said precursor membrane.

11. The method in accordance with claim 8, wherein said reactive liquid has a viscosity of at least 50 mPa·s at 20° C. under atmospheric pressure.

12. The method in accordance with claim 8, wherein said reactive liquid contains a surfactant.

13. The method in accordance with claim 8, wherein said reactive liquid contains a film-forming agent.

14. The method in accordance with claim 1, wherein said swelling type of organic compound is dimethylsulfoxide (DMSO).

* * * * *